United States Patent [19]
Bauer

[11] Patent Number: 5,503,015
[45] Date of Patent: Apr. 2, 1996

[54] BLADE BALANCER

[75] Inventor: Gerd F. Bauer, Waldo, Wis.

[73] Assignee: Magna-Matic Corporation, Waldo, Wis.

[21] Appl. No.: 350,806

[22] Filed: Dec. 7, 1994

Related U.S. Application Data

[62] Division of Ser. No. 67,082, May 26, 1993, Pat. No. 5,398,550.

[51] Int. Cl.$^6$ ................................................ G01M 1/12
[52] U.S. Cl. ........................................ 73/480; 73/456
[58] Field of Search ........................... 73/480, 455, 456; 74/573 R

[56] References Cited

U.S. PATENT DOCUMENTS

| | | | |
|---|---|---|---|
| 2,987,924 | 6/1961 | Karrels | 73/480 |
| 2,992,489 | 7/1961 | Karrels | 73/480 |
| 3,659,463 | 5/1972 | Karrels | 73/480 |

*Primary Examiner*—Robert Raevis
*Assistant Examiner*—Christine K. Oda
*Attorney, Agent, or Firm*—Donald Cayen

[57] ABSTRACT

A blade balancer qualitatively determines imbalance of a lawn mower blade. The blade balancer comprises a tube that rotates on precision bearings about a horizontal axis. A sphere is slidingly captured in one end of the tube concentric with the axis of rotation. A spring biases the sphere partially out of the tube. The mounting hole of a lawn mower blade is placed over the sphere, and the lawn mower blade is pushed against the sphere to slide the sphere into the tube inner diameter until the blade contacts an annular magnet secured to the tube and surrounding the sphere. The blade is thus accurately located for rotation about the horizontal axis. Gravity rotates the lawn mower blade, tube, and sphere together to place any unbalanced mass of the blade at a lowermost point under the horizontal axis. In a modified embodiment of the invention, the sphere is replaced by a plug having a cylindrical section that is slidably captured in the tube inner diameter and a conical section. The conical section projects out of the tube to enter the mounting hole of the lawn mower blade.

4 Claims, 2 Drawing Sheets

BLADE BALANCER

This is a divisional of application(s) Ser. No. 08/067,082 filed on May 26, 1993, now U.S. Pat. No. 5,398,550.

BACKGROUND OF THE INVENTION

1. Field of the Invention. This invention pertains to balancing machines, and more particularly to apparatus that qualitatively indicates imbalance in rotatable objects.

2. Description of the Prior Art. Various equipment has been developed to determine and eliminate mechanical imbalance in rotatable objects. Such equipment assures that the mass of the object is symmetrically distributed about its axis of rotation. Failure to correct imbalance results in well known detrimental effects to both the rotating object and to the structure to which the object is mounted.

Rotatable objects are invariably balanced by adding or subtracting mass at appropriate locations on the object. For example, it is known to add small weights to an object diametrically opposite the location of an eccentric center of mass. Alternately, material may be removed in radial alignment with and on the same side of the axis of rotation as an eccentric center of mass. Numerous balancing machines are in present use for performing the foregoing balancing procedures.

The capabilities of prior balancing equipment vary considerably. To suit the requirement of a particular application, some equipment is very sophisticated, having the ability to both measure and correct object imbalance on an automatic basis. Such equipment is expensive to manufacture, and skilled personnel are required to operate it. Other applications require more modest demands of the balancing machinery. For example, some balancing machines are capable of only measuring imbalance, while other machines are capable of only correcting imbalance.

A particularly important application of balancing machines concerns rotatable objects that are long, narrow, and thin. A typical example is a lawn mower blade. Lawn mower blades rotate at very high speeds. Further, in many lawn mowers, the blade acts as the flywheel for the internal combustion engine that powers the lawn mower. It is therefore vital that the blade be accurately balanced.

In addition to the actual balancing, another very important requirement must be met in the case of lawn mower blades. The blades are subject to very hard use, and even abuse, during the normal course of their operation. Consequently, the blades must be periodically removed from the lawn mowers and serviced. That is in contrast to many rotatable objects whose balance characteristics do not change with use and so need be balanced only when they are initially placed into service. When the frequent servicing factor is considered in light of the relatively low initial cost of a lawn mower blade, the requirement arises that lawn mower blades must be balanceable at a very low cost. That is, it is an economic necessity that a blade be rebalanced for only a few dollars. Accordingly, low cost equipment is used to service lawn mower blades, and different machines are usually used to determine the amount and location of imbalance and to correct the imbalance.

An example of a prior machine for determining the amount and location of imbalance in a lawn mower blade and the like may be seen in U.S. Pat. No. 2,987,924. In the balancer of that patent, a cylindrical tube having a cone on one end is mounted on bearings for rotation about a horizontal axis. A strong magnet is accurately slidable along the cylindrical tube. A mounting hole in the lawn mower blade is centered on the cone, and the magnet is slid along the tube until it contacts and holds the blade firmly in place with the plane of the blade being perpendicular to the horizontal axis. If the weights of the two blade ends are unequal, the tube, cone, and blade will rotate under the influence of gravity such that the blade heavier end lies under the lighter end. Then the blade is pulled from the balancer and taken to another machine for removal of material.

A balancing application somewhat related to lawn mower blades concerns industrial and commercial saw blades. Such blades are very thin and have relatively large diameters. Their mounting holes are often tapered. U.S. Pat. No. 3,659,463 shows an example of a machine for qualitatively determining the imbalance of saw blades.

The balancing machines of the 2,987,924 and 3,659,463 patents have been in commercial use for many years and have contributed to the balancing of countless lawn mower blades, saw blades, and the like. Nevertheless, they are subject to improvement.

SUMMARY OF THE INVENTION

In accordance with the present invention, a precision blade balancer is provided that determines imbalance of a rotatable object in a more economical manner than was previously possible. This is accomplished by apparatus that includes a slidable locating plug and a magnet that cooperate to locate and hold the object for gravity induced rotation.

In one embodiment of the invention, the locating plug is in the form of a sphere that is slidably captured inside one end of a tube. The second end of the tube is mounted in very accurate bearings for rotation about the longitudinal axis of a horizontally oriented shaft. The centroid of the sphere is coincident with the tube axis of rotation. The sphere is biased out of the tube first end to a maximum projection therefrom of approximately one-third of the sphere diameter. The sphere can be depressed fully into the tube against the biasing force.

The magnet is annular in shape. It is secured snugly over the tube and generally surrounding the sphere. The object to be balanced must be made of a magnetic material, and it must have a mounting hole generally coincident with its axis of rotation.

The blade balancer of the invention is used by placing the mounting hole of the object over the sphere. The object is then pushed against the sphere such that the sphere is forced into the tube until the object contacts the magnet. The magnet holds the object in place with its axis of rotation concentric with the tube axis of rotation. Upon releasing the object, the magnet, tube, sphere, and object are free to rotate as a unit about the tube axis of rotation. Gravity acts on the object to rotate it to a position whereat any unbalanced mass lies at a lowermost point under the axis of rotation. The object can then be pulled from the blade balancer for removal of the excess mass.

In a modified embodiment of the invention, the locating plug is formed as a combined cylinder and cone. The plug is biased to project the cone end thereof out of the tube. The operation of the cylinder and cone plug is generally similar to that of the sphere embodiment. The mounting hole of the object to be balanced is placed over the cone end of the plug. The object and the plug are pushed together against the biasing force until the object contacts and is held in place by the magnet. Upon releasing the object, it will rotate with the tube, magnet, and plug to place any unbalanced mass at a lowermost position relative to the rest of the object.

The apparatus of the invention enables imbalance of a rotatable object to be determined with great accuracy but with very low cost. Low initial cost combined with ease of operation results in a highly efficient and productive balancing machine.

Other advantages, benefits, and features of the present invention will become apparent to those skilled in the art upon reading the detailed description of the invention.

DETAILED DESCRIPTION OF THE PREFERRED EMBODIMENT

Figure 1:
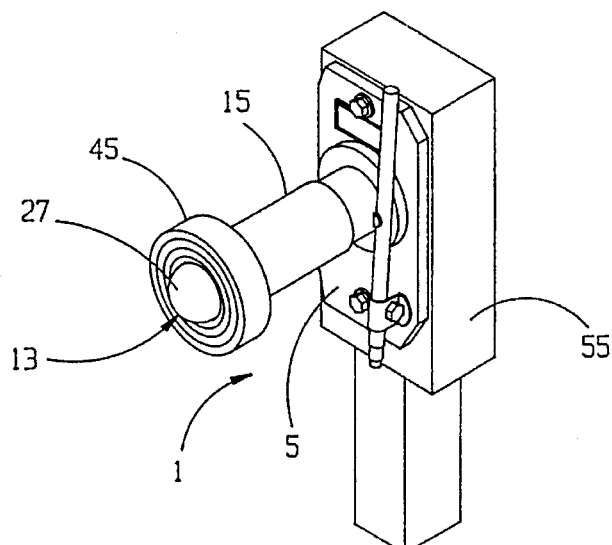
FIG. 1 is a perspective view of the blade balancer of the present invention.
Figure 2:
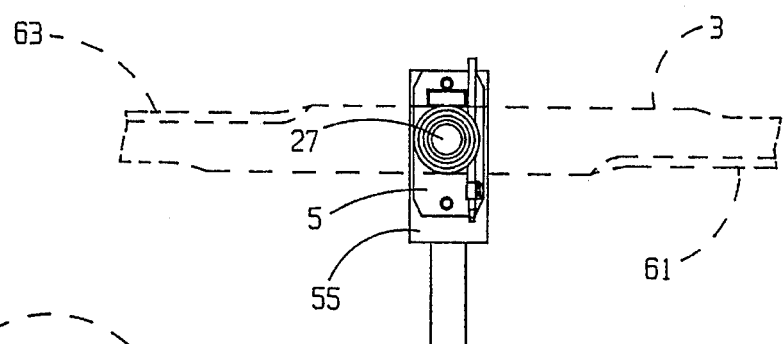
FIG. 2 is a front view of the blade balancer showing a typical object initially placed on the blade balancer for balancing.
Figure 3:
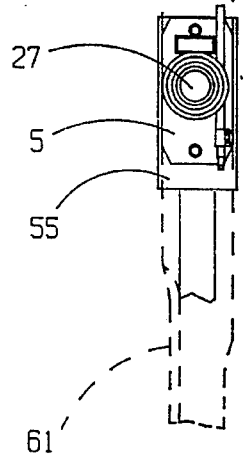
FIG. 3 is a view similar to FIG. 2, but showing the orientation of an unbalanced object held in place on the blade balancer.
Figure 4:
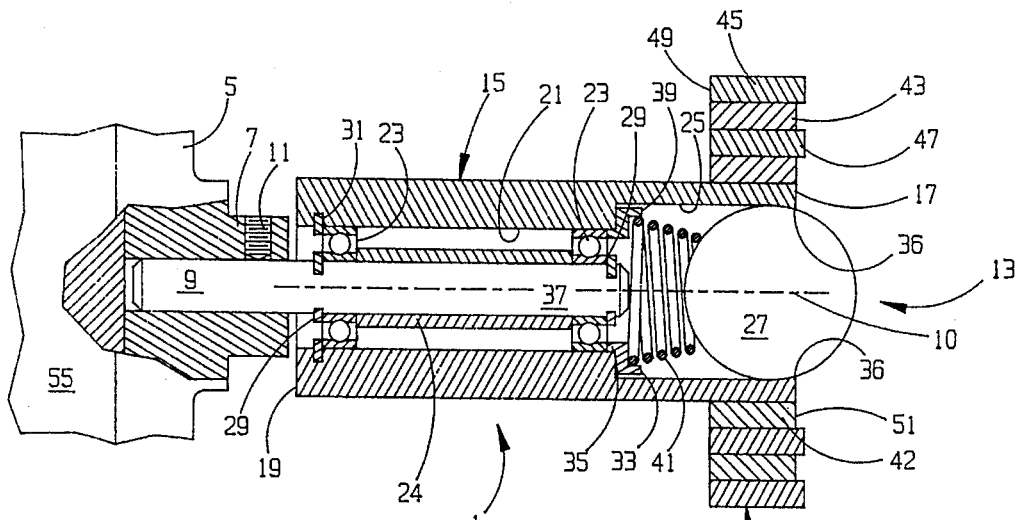
FIG. 4 is a longitudinal cross sectional view of the blade balancer of the present invention.

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring to FIGS. 1–5, a blade balancer 1 is illustrated that includes the present invention. The blade balancer 1 is particularly useful for qualitatively determining the imbalance of thin planar objects such as a lawn mower blade 3. However, it will be understood that the invention is not limited to use with rectangularly shaped objects.

The blade balancer 1 comprises a base plate 5 that has a hub 7. The base plate 5 is bored to receive a shaft 9 having a longitudinal axis 10. The shaft 9 is retained in the base plate by a set screw 11 that passes through the base plate hub 7.

Mounted for rotation on the shaft 9 is a balancing unit 13. Looking especially at FIG. 4, the balancing unit 13 includes an elongated tube 15 having front and back ends 17 and 19, respectively. The tube 15 has a first inner diameter 21 that extends from the tube back end 19. The first diameter 21 is sized to accept the outer races of a pair of spaced apart precision bearings 23. The inner races of the bearings 23 receive the shaft 9. Hence, the axis of rotation of the tube coincides with the shaft longitudinal axis 10. A spacer 24 is placed between the inner races of the two bearings 23, and the bearing inner races are captured on the shaft by a pair of snap rings 29. The bearings outer races are captured between a snap ring 31 and a stepped washer 33. The stepped washer 33 has a hub 35. The hub 35 has an outer diameter that is pressed into the tube inner diameter 21.

The tube 15 has a second internal diameter 25 extending from the tube front end 17. The second inner diameter 25 is concentric with the tube axis of rotation 10, and it accepts a sphere 27, such as a hard steel ball. To capture the sphere 27 in the tube second diameter, the front end 17 of the tube is peened over in several places 36 around the circumference of its junction with the second inner diameter 25. The sizes of the inner diameter 25 and the sphere 27 are carefully controlled so as to enable the sphere to slide along the tube axis of rotation 10 with minimum radial movement within the inner diameter 25. Consequently, the centroid of the sliding sphere remains concentric with the tube axis of rotation 10.

The stepped washer 33 has a flat surface 37 surrounded by an annular wall 39. A cone spring 41 seats on the washer surface 37 and bears against the sphere 27. The spring 41 acts to force the sphere out of the tube 15 such that normally approximately one-third of the sphere projects out of the tube.

Secured on the tube 15 at its front end 17 is an aluminum sleeve 42. Surrounding the aluminum sleeve 42 is an annular permanent magnet 43. The magnet 43 is sandwiched between outer and inner steel bands 45 and 47, respectively. Preferably, the front edges 49 of the steel bands 45 and 47 overhang the front end 17 of the tube, the front end 51 of the aluminum sleeve 42, and front end 53 of the magnet 43.

Figure 5:
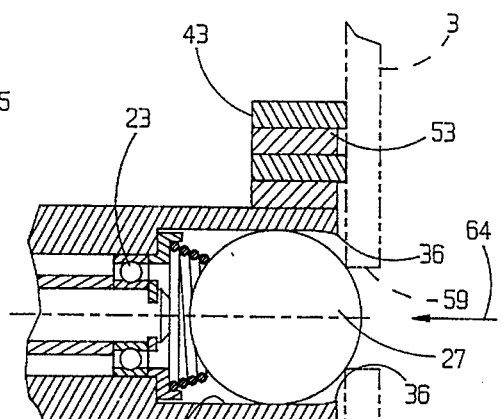
FIG. 5 is a view similar to FIG. 4, but showing an object held in place on the blade balancer.

In use, the face plate 5 is attached in any suitable manner to a stand or post 55 such that the axis 10 of the shaft 9 is horizontal. In FIG. 5, reference numeral 59 represents a mounting hole located at substantially the axis about which the blade 3 rotates when it is in use. A person places the blade mounting hole 59 against the sphere 27. He pushes the blade in the direction of arrow 64 (FIG. 5) against the sphere with sufficient force to slide the sphere in the inner diameter 25 of the tube 15 against the force of the spring 41. The person pushes the blade until it contacts the front edges 49 of the steel bands 45 and 47. At that point, the magnet 43, acting through the steel bands, holds the blade in place with the axis of rotation of the blade mounting hole concentric with the tube axis of rotation 10. Then the person manually rotates the blade, together with the entire balancing unit 13, such that the blade is horizontally orientated, FIG. 2. When the person releases the blade, the blade and balancing unit will rotate under the influence of gravity so that one blade end 61 lies lower than the other end 63, FIG. 3, if the end 61 is heavier than the end 63. The anti-friction qualities of the bearings 23 enable even small amounts of imbalance between the blade ends 61 and 63 to cause rotation of the blade and the balancing unit.

Upon determining that the arm 61 is the heavier, the person removes the blade 3 from the blade balancer 1. That is achieved merely by pulling one blade end 61 or 63 in the direction of arrow 66 away from the balancing unit 13 to break the magnetic force between the blade and the magnet 43. The entire blade is then taken away from the blade balancer to have material removed from its heavy end 61 by any of a variety of well known methods. Then the balance of the blade is rechecked on the blade balancer 1 by repeating the foregoing procedure. When the blade remains at the horizontal attitude of FIG. 2 after release, the balancing process is complete.

Figure 6:
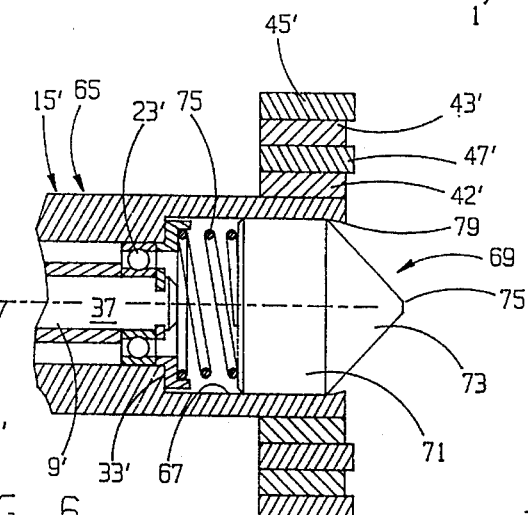
FIG. 6 is a view similar to FIG. 4, but showing a modified embodiment of the present invention.
Figure 7:
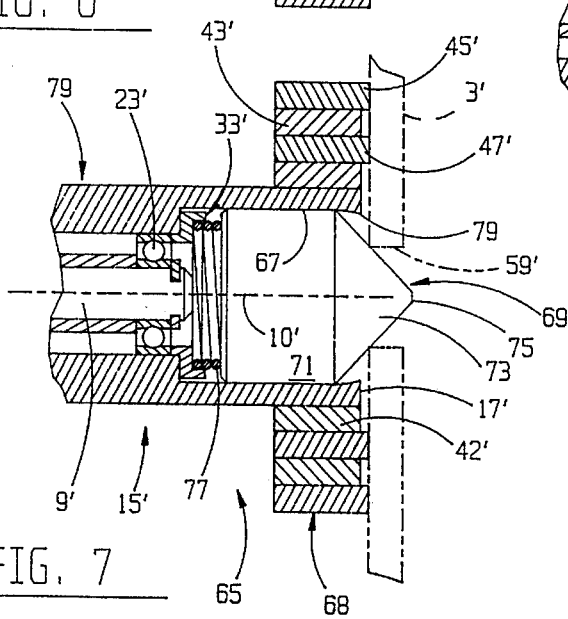
FIG. 7 is a view similar to FIG. 5, but showing an object in place on the blade balancer of FIG. 6.

Turning to FIGS. 6 and 7, a modified blade balancer 65 is depicted. The blade balancer 65 is generally similar to the blade balancer 1 described above, having a shaft 9' with a horizontal axis 10' and a balancing unit 68. The balancing unit 68 includes a tube 15' with an axis of rotation that coincides with the shaft axis 10', precision bearings 23', and a stepped washer 33'. The blade balancer 65 also has a magnet 43' with steel bands 45' and 47' and an aluminum sleeve 42'.

The tube 15' has an inner diameter 67 that is concentric with the tube axis of rotation 10. The tube inner diameter 67 slidingly receives a locating plug 69 in the form of a combined cylindrical section 71 and conical section 73. The end of the conical section 73 may be flattened as at reference numeral 75. The cylindrical section 71 of the locating plug 69 slides with minimal radial clearance within the tube inner diameter 67. A spring 77 seats against the stepped washer 33' and biases the locating plug out of the tube inner diameter such that the conical section projects from the tube end 17'. To capture the locating plug in the tube, the front end 17' of the tube is peened over in several places 79 around the circumference of its junction with the inner diameter 67.

The blade balancer 65 is used in a manner similar to the use of the blade balancer 1 described previously in conjunction with FIGS. 1–5. A person places the mounting hole 59' of a lawn mower blade 3' or the like over the conical section 73 of the locating plug 69. The person pushes the blade 3' against the plug to slide it in the inner diameter 67 of the tube 15' until the blade contacts the bands 45' and 47'. The magnetic force of the magnet 43' then holds the blade in place. The person manually rotates the blade to the horizontal attitude of FIG. 2 and releases his hands. Unless the blade is already balanced, the blade and the balancing unit 68 will rotate to position similar to that of FIG. 3. The person then grasps the blade by one end and pulls it from the blade balancer 65 for metal removal or other servicing.

In summary, the results and advantages of lawn mower blades, saw blades, and the like can now be more fully realized. The blade balancers 1 and 65 of the present invention enable any imbalance in a blade to be determined quickly, accurately, and at an exceptionally low cost. This favorable result comes from using a spring loaded sphere 27 or other locating plug to locate a mounting hole 59 of the blade 3 concentric with a horizontal axis 10 of rotation of the blade balancer. The blade is magnetically held to the blade balancer for rotation therewith by gravity about the blade balancer axis of rotation to qualitatively determine any imbalance in the blade.

Thus, it is apparent that there has been provided, in accordance with the invention, a blade balancer that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A method of balancing a lawn mower blade having a mounting hole therein comprising the steps of:
   a. providing a stationary shaft that defines an axis of rotation;
   b. mounting a tube for rotation on the shaft;
   c. biasing a locating plug to project out of the tube;
   d. placing the blade mounting hole over the locating plug;
   e. pushing the blade against the locating plug and forcing the locating plug into the tube;
   f. magnetically holding the blade proximate the tube; and
   g. rotating the blade, locating plug, and tube about the axis of rotation by gravity and determining any imbalance in the blade.

2. A method of balancing a lawn mower blade having a mounting hole therein comprising the steps of:
   a. providing a tube;
   b. biasing a locating plug to project out of the tube;
   c. placing the blade mounting hole over the locating plug;
   d. pushing the blade against the locating plug and forcing the locating plug into the tube;
   e. magnetically holding the blade proximate the tube; and
   f. rotating the blade, locating plug, and tube about an axis of rotation by gravity and determining any imbalance in the blade, wherein:
      i. the step of providing the tube comprises the step of providing the tube with an end and with an inner diameter extending from the end that is concentric with the axis of rotation; and
      ii. the step of biasing the locating plug out of the tube comprises the step of slidingly capturing the locating plug in the tube inner diameter.

3. A method of balancing a lawn mower blade having a mounting hole therein comprising the steps of:
   a. providing a tube;
   b. biasing a locating plug to project out of the tube;
   c. placing the blade mounting hole over the locating plug;
   d. pushing the blade against the locating plug and forcing the locating plug into the tube;
   e. magnetically holding the blade proximate the tube; and
   f. rotating the blade, locating plug, and tube about an axis of rotation by gravity and determining any imbalance in the blade, wherein:
      i. the step of providing the tube comprises the step of providing the tube with an end and with an inner diameter extending from the end that is concentric with the axis of rotation; and
      ii. the step of biasing the locating plug out of the tube comprises the steps of:
   providing a sphere; and
   slidably capturing the sphere in the tube inner diameter.

4. A method of balancing a lawn mower blade having a mounting hole therein comprising the steps of:
   a. providing a tube;
   b. biasing a locating plug to project out of the tube;
   c. placing the blade mounting hole over the locating plug;
   d. pushing the blade against the locating plug and forcing the locating plug into the tube;
   e. magnetically holding the blade proximate the tube; and
   f. rotating the blade, locating plug, and tube about an axis of rotation by gravity and determining any imbalance in the blade, wherein:
      i. the step of providing the tube comprises the step of providing the tube with an end and with an inner diameter that extends from the end that is concentric with the axis of rotation; and
      ii. the step of biasing the locating plug out of the tube comprises the steps of:
   providing a plug having a cylindrical section and a conical section; and
   slidingly capturing the plug cylindrical section in the tube inner diameter and projecting the plug conical section outside the tube.

* * * * *